(12) United States Patent
Baba et al.

(10) Patent No.: US 6,910,439 B2
(45) Date of Patent: Jun. 28, 2005

(54) VEHICLE METER

(75) Inventors: Hideto Baba, Niigata (JP); Atsushi Fujita, Niigata (JP); Norihiro Ogawa, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 48 days.

(21) Appl. No.: 10/250,332

(22) PCT Filed: Jul. 15, 2002

(86) PCT No.: PCT/JP02/07187
§ 371 (c)(1),
(2), (4) Date: Jun. 30, 2003

(87) PCT Pub. No.: WO03/038847
PCT Pub. Date: May 8, 2003

(65) Prior Publication Data
US 2004/0045494 A1 Mar. 11, 2004

(30) Foreign Application Priority Data

Oct. 31, 2001 (JP) ........................ 2001-334538
Nov. 30, 2001 (JP) ........................ 2001-366469

(51) Int. Cl.[7] ............................ G01P 1/08; H01H 13/14
(52) U.S. Cl. .............. 116/62.3; 116/62.1; 116/DIG. 28; 200/341; 200/520
(58) Field of Search .............................. 116/62.1, 62.2, 116/62.3, 62.4, 279, 281, 283, DIG. 28; 200/292, 296, 341, 345, 520, 533, 534, 573, 574

(56) References Cited

U.S. PATENT DOCUMENTS

| | | | | |
|---|---|---|---|---|
| 3,749,872 A | * | 7/1973 | Foster | 200/292 |
| 3,809,838 A | * | 5/1974 | Coppola | 200/532 |
| 3,845,254 A | * | 10/1974 | Schneider | 200/5 A |
| 3,928,741 A | * | 12/1975 | Comer | 200/534 |
| 4,156,802 A | * | 5/1979 | Gilano et al. | 200/5 A |
| 4,251,703 A | * | 2/1981 | Hoeft et al. | 200/341 |
| 4,439,646 A | * | 3/1984 | Bouvrande | 200/5 A |
| 4,924,045 A | * | 5/1990 | Zumkeller et al. | 200/341 |

(Continued)

FOREIGN PATENT DOCUMENTS

| | | | | |
|---|---|---|---|---|
| EP | 1341199 A1 | * | 9/2003 | ......... H01H/13/14 |
| JP | 57-3101 | | 1/1982 | |
| JP | 60-192329 | | 12/1985 | |
| JP | 8-153437 | | 6/1996 | |
| JP | 2730103 | | 12/1997 | |
| JP | 11-64033 | | 3/1999 | |
| JP | 11-211512 | | 8/1999 | |

Primary Examiner—R. Alexander Smith
(74) Attorney, Agent, or Firm—McDermott Will & Emery LLP

(57) ABSTRACT

Provided is a vehicular meter, which can suppress the complication of structures of peripheral parts, when an operation shaft and an elastic member are to be supported, thereby to realize the cost reduction. The vehicular meter comprises: an indication element D3; a circuit board 5 arranged on the back of the indication element D3; and a manipulation mechanism S for switching pieces of information to be indicated by the indication element D3. The manipulation mechanism S includes: a switch element 11; an operation shaft 12 for activating the switch element 11; and an elastic member 13 for returning the operation shaft 12. This operation shaft 12 includes a push portion 161 for actuating the switch element 11; hook portions 171 and 172 inserted into a through hole 52 of the circuit board 5 to come into engagement with the back face of the circuit board 5; a flange portion 16 opposed to the circuit board 5. The elastic member 13 is positioned between the flange portion 16 and the circuit board 5 for biasing the hook portions 171 and 172 in a direction to abut against the circuit board 5 by its restoring force.

6 Claims, 3 Drawing Sheets

U.S. PATENT DOCUMENTS

| | | | |
|---|---|---|---|
| 5,173,578 A | | 12/1992 | Tama .......................... 200/345 |
| 5,430,262 A | * | 7/1995 | Matsui et al. ................ 200/5 A |
| 5,552,964 A | * | 9/1996 | Naito .......................... 361/781 |
| 5,579,900 A | * | 12/1996 | Pryor et al. .................. 200/331 |
| 5,720,379 A | * | 2/1998 | Schwartz et al. ......... 200/318.1 |
| 5,821,490 A | * | 10/1998 | Blossfeld .................... 200/524 |
| 6,163,282 A | * | 12/2000 | Mitsuzuka et al. ........... 341/22 |
| 6,180,905 B1 | * | 1/2001 | Pollock et al. ............... 200/527 |
| 6,278,069 B1 | * | 8/2001 | Lee et al. ................. 200/16 C |
| 6,281,482 B1 | * | 8/2001 | Chu ........................... 219/507 |
| 6,300,939 B1 | * | 10/2001 | Decker et al. .............. 345/157 |
| 6,774,509 B2 | * | 8/2004 | Chu ........................... 307/112 |
| 2004/0045494 A1 | * | 3/2004 | Baba et al. ................ 116/62.3 |

\* cited by examiner

VEHICLE METER

TECHNICAL FIELD

The present invention relates to a vehicular meter to be mounted on various vehicles such as motorbikes or automobiles.

BACKGROUND ART

A vehicular meter of this kind is known, as disclosed in JP-A-11-211512 and JP-A-11-64033. The vehicular meter disclosed is provided with a liquid crystal indication element (or indication element) for indicating a piece of information such as the travel distance of a vehicle, a hard circuit board arranged on the back of the liquid crystal indication element, a switch element mounted on the circuit board, and an operation shaft adapted to be manually pushed for actuating the switch element. In response to the pushing operation of the operation shaft, the value (or information) indicated in the liquid crystal indication element is reset or interchanged by another kind of information.

The operation shaft is assembled together with an elastic member made of a coil spring into the vehicular meter. This coil spring biases the operation shaft in a non-pushing direction so that the operation shaft is pushed to actuate the switch element and so that the operation shaft is returned to the initial position when the resetting or indication switching of the information indicated in the liquid crystal indication element is ended. At a case provided separately of the circuit board or an optical guide for holding an indication panel, there is formed a support portion for holding the operation shaft and the coil spring. At this support portion, the operation shaft holds the coil spring so that it can be pushed and returned.

In the vehicular meters disclosed in the above-specified individual publications, however, at the parts such as a case or an optical guide plate (usually molded of a synthetic resin) to be prepared separately of the circuit board, it is necessary to form the portion for supporting the operation shaft or the coil spring, such as a holding portion or a guide portion for supporting the operation shaft stably, a spring holding portion for holding the coil spring stably, or a regulating portion for limiting the movement of the operation shaft. Therefore, the shapes of the parts are complicated to raise a problem that the cost for manufacturing the mold or the working cost rises thereby to invite an increase in cost.

The present invention has been conceived in view of those points and has a main object to provide a vehicular meter, which is enabled to realize a decrease in cost by suppressing the complicated structure of peripheral parts for supporting an operation shaft or an elastic member.

DISCLOSURE OF THE INVENTION

According to the present invention, there is provided a vehicular meter characterized: by comprising: an indication element for indicating a predetermined piece of information, a circuit board arranged on the back of said indication element, and a manipulation mechanism for switching pieces of information to be indicated by said indication element; in that said manipulation mechanism includes a switch element mounted on said circuit board, an operation shaft for activating said switch element by a pushing operation, and an elastic member for returning said operation shaft in the non-pushing direction; in that said operation shaft includes a push portion for actuating said switch element, hook portions inserted into a through hole formed in said circuit board to come into engagement with the back face of said circuit board, and a flange portion opposed to said circuit board; and in that said elastic member is positioned between said flange portion and said circuit board for biasing said hook portions in a direction to abut against said circuit board by its restoring force. For supporting said operation shaft and said elastic member, therefore, it is possible to suppress the complicated structure of the peripheral parts such as the casing member, the holder and the facing member thereby to achieve the cost reduction.

According to the invention, moreover, there is provided a vehicular meter characterized: by comprising: an indication element for indicating a predetermined piece of information, a circuit board arranged on the back of said indication element, and a manipulation mechanism for switching pieces of information to be indicated by said indication element; in that said manipulation mechanism includes a switch element mounted on said circuit board, an operation shaft for activating said switch element by a pushing operation, an elastic member for returning said operation shaft in the non-pushing direction, and a spacer member having an insertion hole for inserting said operation shaft thereinto and interposed between said elastic member and said circuit board; in that said operation shaft includes a push portion for actuating said switch element, hook portions inserted into the insertion hole of said spacer member and into a through hole formed in said circuit board to come into engagement with the back face of said circuit board, and a flange portion opposed to said spacer member; and in that said elastic member is positioned between said flange portion and said spacer member for biasing said hook portions in a direction to abut against said circuit board by its restoring force. For supporting said operation shaft and said elastic member, therefore, it is possible to suppress the complicated structure of the peripheral parts such as the casing member, the holder and the facing member thereby to achieve the cost reduction.

In the vehicular meter of the present invention, moreover, said elastic member is made of a coil spring. As compared with another elastic member, the coil spring has a merit in that it provides a better pushing/returning feeling of said operation shaft and is preferred by the user.

In the vehicular meter of the present invention, moreover, a holding portion for holding said elastic member is formed on said operation shaft. When said operation shaft is to be inserted and mounted on said circuit board, said elastic member can be held in advance on said operation shaft. Therefore, it is possible to prevent said elastic member from coming out thereby to improve the assembling workability.

In the vehicular meter of the present invention, moreover, said flange portion is provided with a stopper portion for regulating the movement of said operation shaft in a pushing direction. Therefore, said switch element can be protected against the excessive push of said operation shaft thereby to improve the reliability.

In the vehicular meter of the present invention, moreover, said indication element is driven by said circuit board so that it can be driven by the circuit board having the switch element mounted thereon. Therefore, any dedicated circuit board for controlling/driving said indication element need not be provided to lower the cost.

In the vehicular meter of the present invention, moreover, said spacer member is interposed between said elastic member and said hook portions, before said operation shaft is inserted into said circuit board, thereby to hold said elastic member on said operation shaft. Therefore, said elastic member can be prevented from coming out thereby to improve the assembling workability.

BEST MODE FOR CARRYING OUT THE INVENTION

Figure 1:
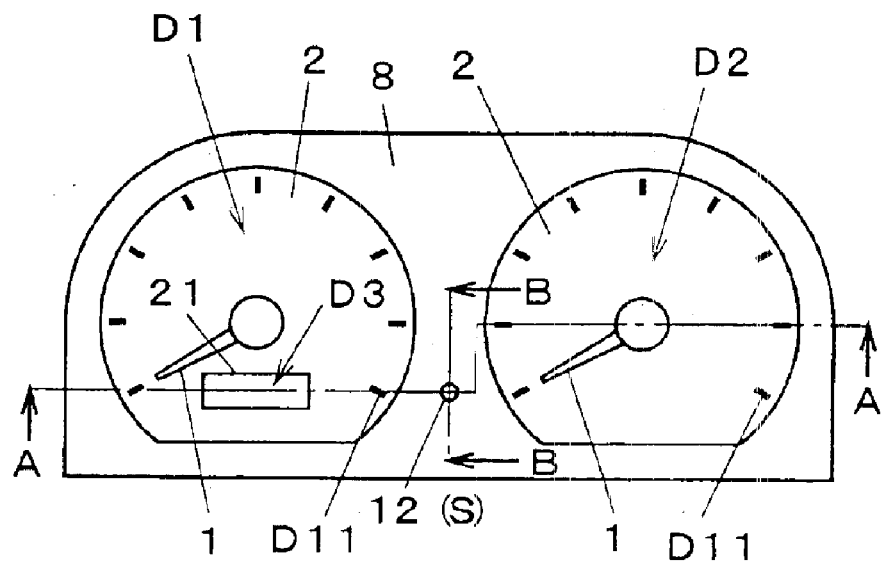
FIG. 1 is a front elevation of a vehicular meter according to a first embodiment of the present invention.

Embodiments of the present invention will be described on the basis of the accompanying drawings. In FIG. 1, a vehicular meter according to the present embodiment comprises; a pointer type indicator (or an indication unit) D1 made of a speed meter for indicating a predetermined piece of information such as a vehicle speed; a pointer type indicator (or an indication unit) D2 made of a tachometer for indicating an engine speed; an indication element D3 positioned between those individual pointer type indicators D1 and D2 for indicating pieces of information including a travel distance, a fuel consumption, an ambient temperature and a time; and a manipulation mechanism S for interchanging the pieces of information to be indicated by that indication element D3, according to the manipulation of the user.

Figure 2:
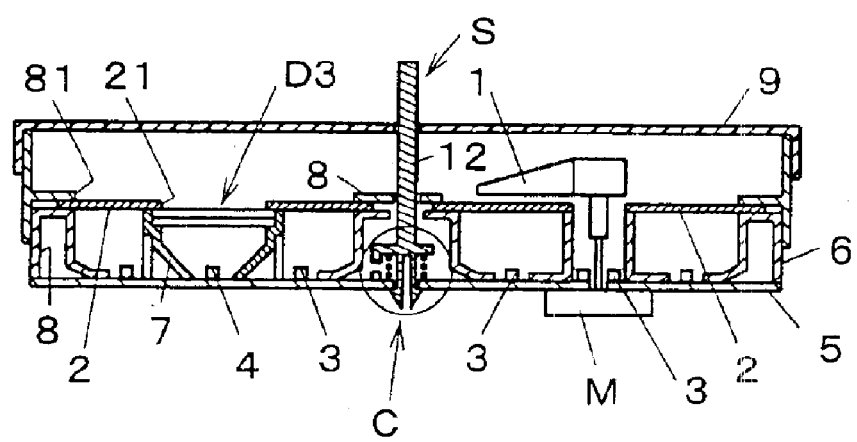
FIG. 2 is a sectional view of A—A of FIG. 1.

Each pointer type indicator D1 or D2 is composed, as shown in FIG. 2, of a pointer 1 to be turned by an instrument movement M, and an indicator panel 2 having an index portion D11 (as referred to FIG. 1) formed therein, such as scales, letters or marks to be indicated by the pointer 1. On the backs of those pointer 1 and indication panel 2, there are arranged a plurality of light sources 3, which respectively correspond to them. In this case, the pointer 1 is made of an optically transmissive material, which can emit a light in response to an irradiation light when the light source 3 is turned ON, and the index portion D11 of the indication panel 2 is made of an optically transmissive material, which can emit a light in response to the irradiation light when the light source 3 is turned ON. At the portion of the indication panel 2, as corresponding to the indication element D3, moreover, there is formed an aperture 21 for exposing the indication face of the indication element D3 to the outside.

The indication element D3 is made of a liquid crystal indication element (or an electronic indication element), for example, for indicating the aforementioned pieces of information such as the travel distance, the fuel consumption, the ambient temperature and the time, on the basis of detection signals (or electric signals) of the not-shown various sensors or the like. The indication element D3 is backed by a light source 4 for illuminating it with a back light.

Each of the light sources 3 and 4 is made of a light emitting diode for emitting a light in a predetermined color, for example, and is mounted on the front face side of a hard circuit board 5 positioned on the back of the indicator panel 2, so that it is fed with a lighting electric power through that circuit board 5. On the back side of the circuit board 5, moreover, there is mounted the instrument movement M, which is fed with a driving electric power through the circuit substrate 5.

On the front side of the circuit board 5, moreover, there is disposed a casing member 6, which is made of a shielding synthetic resin of a white color, for example, to function as a reflector and a frame member. In this casing member 6, there are formed a plurality of illumination chambers, which house the light sources 3 and guide their lights to the indication panel 2 and the pointer 1.

At and around the portion, as corresponding to the indication element D3, of the casing member 6, there is formed a space, in which there is arranged a holder 7 for holding the indication element D3. The light source 4 is arranged on the bottom side of the holder 7.

In front of the casing member 6, there is arranged across the indication panel 2 a facing member 8, in which a window portion 81 is formed for exposing each of the pointer type indicators D1 and D2. Moreover, a transparent or semitransparent panel 9 is arranged in front of the facing member 8.

The manipulation mechanism S is constructed of a switch element 11, an operation shaft 12 for actuating the switch element 11 by pushing it, and an elastic member 13 for returning the operation shaft 12 in the non-pushing direction (opposed to the pushing direction).

Figure 3:
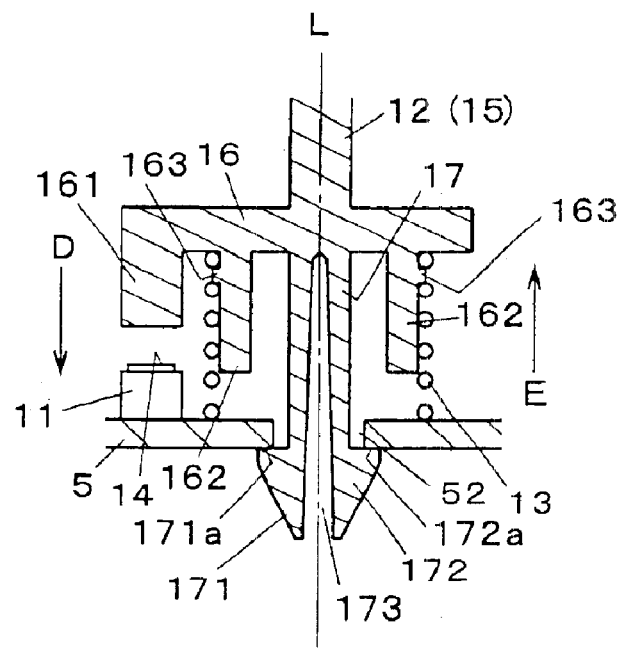
FIG. 3 is an enlarged sectional view of a region of arrow C in FIG. 2.

The switch element 11 is made of a tact switch having an actuation portion 14, which is turned ON/OFF by the later-described push portion of the operation shaft 12, as shown in detail in FIG. 3, to output a switching signal to the not-shown control/drive circuit for controlling the indication of the indication element D3. In response to the switching signal issued through the actuation portion 14, the aforementioned control/drive circuit outputs an output signal for switching the indication to the indication element D3 thereby to interchange or reset the information indicated in the indication element D3. Here, this signal transfer of the switch element 11→the aforementioned control/drive circuit→the indication element D3 is performed through the not-shown circuit pattern formed in the circuit board 5. At this time, moreover, the actuation portion 14 is turned ON to output the switching signal, when the operation shaft 12 is pushed in the direction of arrow D, and is returned to the initial position (or turned OFF) by releasing the push of the operation shaft 12.

The operation shaft 12 is made of a black synthetic resin, for example, and includes: a first stem portion 15 extending to the outside through the casing member 6, the indication panel 2, the facing member 8 and the transparent panel 9; a flange portion 16 extending from the first stem portion 15 perpendicularly of the axial direction toward the outer circumference; and a second stem portion 17 extending continuously from that flange portion 16 in the same axial direction as that of the first stem portion 15. Here, the axis (or axial direction) L of those individual stem portions 15 and 17 is indicated by a single-dotted line.

Figure 4:
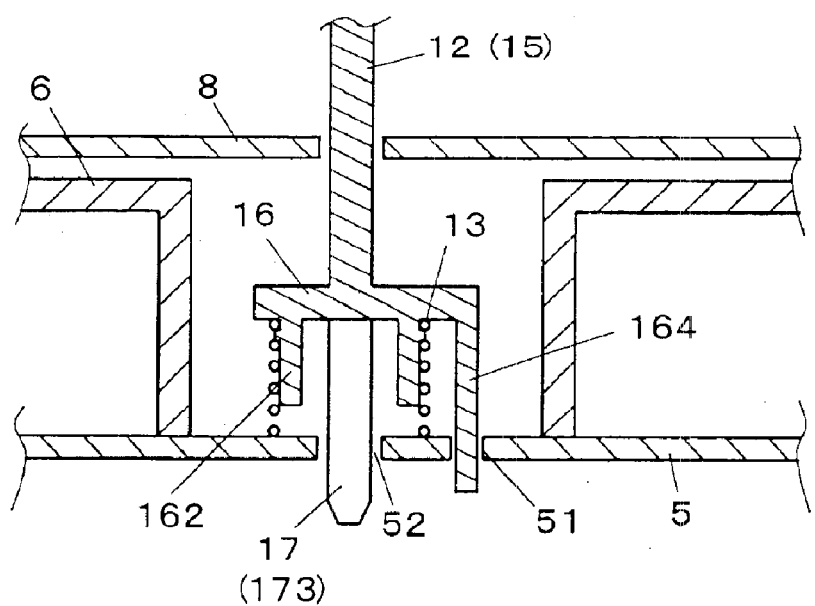
FIG. 4 is a sectional view of B—B of FIG. 1.

The flange portion 16 includes: a push portion 161 for actuating the actuation portion 14 of the switch element 11 in response to the pushing action of the operation shaft 12; a stopper portion 162 extending along the axis L of the first and second stem portions 15 and 17 toward the circuit board 5 and adapted to come, when the operation shaft 12 is excessively pushed, into abutment against the circuit board 5 so that it may regulate the movement of the operation shaft 12 in the pushing operation direction thereby to protect the switch element 11 from the excessive push; and an anti-rotation portion 164 (as referred to FIG. 4) extending along the axis L from a position different from the stopper portion 162 and the second stem portion 17 toward the circuit board 5 so that it may prevent the turn of the operation shaft 12 when its leading end side is inserted into a hole portion 51 formed in the circuit board 5.

This stopper portion 162 is formed into such a cylindrical shape as surrounds the second stem portion 17 and can insert the elastic member 13 in the axial direction of the operation shaft 12. On the outer circumference of the stopper portion 162, there is formed a ridge-shaped holding portion 163 for holding the elastic member 13 so as to prevent the elastic member 13 inserted onto the stopper portion 162 from coming out when the operation shaft 12 is to be mounted on the circuit board 5.

On the leading end side of the second stem portion 17, there are formed a pair of hook portions 171 and 172, which have a slit 173 formed inbetween to extend along the axis L toward the side of the first stem portion 15.

The hook portions 171 and 172 are inserted so far into a through hole 52 formed in the corresponding position of the circuit board 5 as to extend through the circuit board 5, and their engagement faces 171a and 172a engage with the outer circumferential edge of the through hole 52 on the back of the circuit board 5.

The elastic member 13 is made of a metallic coil spring, which is so inserted on the outer circumferential portion of the stopper portion 162 of the operation shaft 12 as to extend/contract along the axis L. While being partially fitted on and held by the holding portion 163 of the stopper portion 162, the elastic member 13 is arranged between the flange portion 16 and the circuit board 5 so that its elastic restoring force biases the operation shaft 12 at all times in the non-pushing direction (as indicated by arrow E). After the push portion 161 of the operation shaft 12 pushed the actuation portion 14 of the switch element 11, therefore, the elastic member 13 can return the operation shaft 12 to the initial position. After the operation shaft 12 was returned, the elastic member 13 is caused by the aforementioned elastic restoring force to urges the engagement faces 171a and 172a of the hook portions 171 and 172 in the direction to abut against the circuit board 5 thereby to hold the operation shaft 12 on the circuit board 5.

Here, the first stem portion 15 of the operation shaft 12 is so guided by at least one of a plurality of holes formed in the indication panel 2, the facing member 8 and the transparent panel 9 that it can be prevented from falling down at the time of the push/return thereby to stabilize the operation of the operation shaft 12.

Here will be described how to assemble the operation shaft 12 and the elastic member 13. At first, the elastic member 13 is inserted from the side of the second stem portion 17 onto the stopper portion 162 of the operation shaft 12 thereby to assemble the elastic member 13 with the operation shaft 12. At this time, the elastic member 13 follows the outer wall portion of the stopper portion 162 thereby to position its center axis generally in alignment with the axis L, and the elastic member 13 is partially fitted on the holding portion 163 so that it is prevented from coming out.

Next, with the push portion 161 of the operation shaft 12 corresponding to the actuation portion 14 of the switch element 11 and with the anti-rotation portion 164 corresponding to the hole portion 51, the second stem portion 17 of the operation shaft 12 holding the elastic member 13 is inserted in the direction of arrow D into the through hole 52. At this time, the paired hook portions 171 and 172 abut at their slopes against the front side corner portion of the through hole 52 and are so constricted toward the axis L as to approach each other (and so that the slit 173 is narrowed), and the total width of the external diameters of the individual hook portions 171 and 172 becomes smaller than the internal diameter width of the through hole 52 so that the hook portions 171 and 172 pass through the through hole 52. The hook portions 171 and 172 restore, after having passed through the through hole 52, the initial direction positions by their own widthwise expanding (or inflating) forces, and the total width of the external diameters of the individual hook portions 171 and 172 exceeds the internal diameter width of the through hole 52 so that the operation shaft 12 is prevented from coming out of the circuit board 5.

As the hook portions 171 and 172 are inserted, on the other hand, the elastic member 13 comes into against the circuit board 5. When the prevention of the hook portions 171 and 172 from coming out of the circuit board 5 is ended, the elastic member 13 is compressed through the flange portion 16 on the side of the circuit board 5. As a result, a pushing-up force (toward the front side) by the elastic member 13 acts on the operation shaft 12, and the engagement faces 171a and 172a of the hook portions 171 and 172 are urged in the direction to abut against the side of the circuit board 5 so that the operation shaft 12 is held on the circuit board 5. By assembling the indication panel 2, the facing member 8 and the transparent panel 9, moreover, the operation shaft 12 is supported, while being prevented from falling down, by at least one (which may be formed in the casing member 6) of the holes formed in those parts.

As has been described hereinbefore, the vehicular meter according to the present embodiment comprises: the indication element D3 for indicating the predetermined information; the circuit board 5 arranged on the back of the indication element D3; and the manipulation mechanism S for switching the indication information of the indication element D3. The manipulation mechanism S includes: the switch element 11 mounted on the circuit board 5; the operation shaft 12 for activating the switch element 11 when pushed; and the elastic member 13 for returning the operation shaft in the non-pushing direction (as indicated by arrow E). The operation shaft 12 includes: the push portion 161 for actuating the switch element 11; the hook portions 171 and 172 inserted into the through hole 52 formed in the circuit board 5 and engaging with the circumferential edge of the through hole 52 on the back of the circuit board 5; and the flange portion 16 confronting the circuit board 5. The elastic member 13 is positioned between the flange portion 16 and the circuit board 5 for biasing the hook portions 171 and 172 in the direction (as indicated by arrow E) to abut against the circuit board 5 by its restoring force. For supporting the operation shaft 12 and the elastic member 13, therefore, it is possible to suppress the complicated structure of the peripheral parts such as the casing member 6, the holder 7 and the facing member 8 thereby to achieve the cost reduction.

Here, the present embodiment has been exemplified by the example, in which the indication element D3 is made of the liquid crystal indication element. However, a display element of any type can be used if it is made of a fluorescent indication tube or an electronic indication element such as an organic EL or an inorganic EL.

In the present embodiment, moreover, the operation shaft 12 is formed of one shaft having the first and second stem portions 15 and 17, but this stem portion may be divided into a plurality of portions.

In the present embodiment, moreover, the elastic member 13 is made of the coil spring 13. However, any type of elastic member can be applied if it can return the operation shaft 12.

Moreover, the elastic member 13 can also be integrally formed from the operation shaft 12.

Moreover, the merit that the elastic member 13 is made of the metallic coil spring 13 is a better feeling at the time of pushing/returning the operation shaft 12, as compared with another elastic member, and is preferred by the user.

In the present embodiment, moreover, the holding portion 163 for holding the coil spring 13 on the operation shaft 12 is formed so that the coil spring 13 can be held in advance on the operation shaft 12 when the operation shaft 12 is to be inserted and mounted on the circuit board 5. Therefore, it is possible to prevent the coil spring 13 from coming out thereby to improve the assembling workability. Here in the present embodiment, the holding portion 163 is formed in the ridge shape, but may take any shape if it can hold the coil spring 13 at the assembling time. For example, the holding portion 163 may be able to hold by press-fitting the coil spring 13.

In the present embodiment, moreover, the flange portion 16 is provided with the stopper portion 162 for regulating the moving stroke of the operation shaft 12 in the pushing direction. Therefore, the switch element 11 can be protected against the excessive push of the operation shaft 12 thereby to improve the reliability.

In the present embodiment, moreover, the stopper portion 162 is provided with the holding portion 163. Therefore, the holding portion 163 need not be separately formed on the operation shaft 12 so that the structure can be simplified.

In the present embodiment, moreover, the indication element D3 is controlled/driven by the circuit board 5 so that it can be driven by the circuit board 5 having the switch element 11 mounted thereon. Therefore, any dedicated circuit board for controlling/driving the indication element D3 need not be provided to lower the cost.

Figure 5:
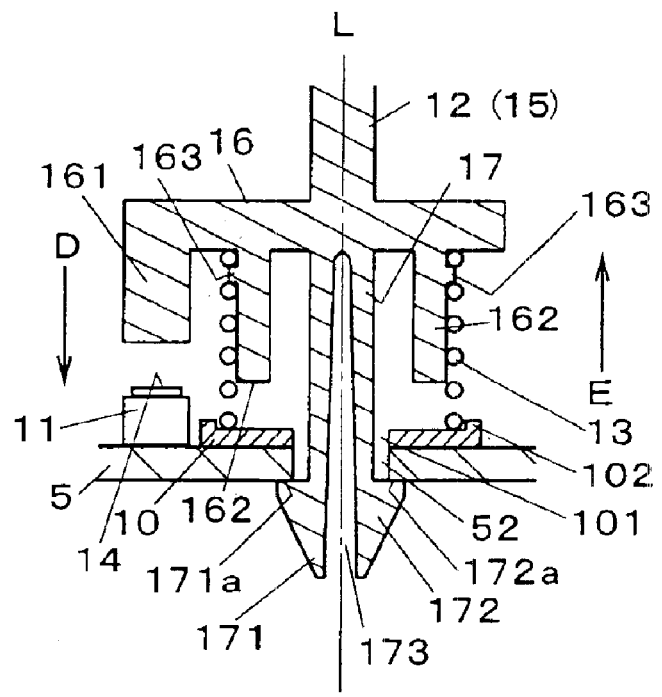
FIG. 5 is a sectional view of an essential portion of a vehicular meter according to a second embodiment of the present invention.

FIG. 5 shows a second embodiment of the vehicular meter according to the invention, in which a spacer member 10 is interposed between the elastic member 13 and the circuit board 5.

The spacer member 10 is molded of a synthetic resin into a doughnut-shaped sheet and is provided with an insertion hole 101 for inserting the second stem portion 17 thereinto, and a positioning portion 102 protruding toward the side of the flange portion 16 in a manner to surround the outer circumference of the elastic member 13. The insertion hole 101 is made coextensive with the through hole 52 of the circuit board 5.

The elastic member 13 is inserted through the stopper portion 162 into the holding portion 163 and held on the holding portion 163 and then the spacer member 10 thus constructed is inserted through the hook portions 171 and 172 onto the second stem portion 17. When inserted onto the second stem portion 17, the spacer member 10 compresses the elastic member 13 between itself and the flange portion 16. And, the hook portions 171 and 172 are pushed at their slopes and warped toward the axis L by the insertion hole 101 of the spacer member 10 so that the spacer member 10 can be passed toward the side of the flange portion 16. After the spacer member 10 was passed, the hook portions 171 and 172 restore their initial states so that the engagement portions 171a and 172a are brought into engagement with the circumferential edge of the back of the insertion hole 101 of the spacer member 10 by the restoring force of the elastic member 13. As a result, the elastic member 13 is compressed and held between the flange portion 16 and the spacer member 10 and is positioned in the positioning portion 102 so that the elastic member 13 can be more reliably prevented from coming out.

After the elastic member 13 was thus held on the operation shaft 12 through the spacer member 10, the operation shaft 12 is mounted on the circuit board 5. This mounting work is done by inserting the hook portions 171 and 172, as protruding from the spacer member 10, into the through hole 52 of the circuit board 5 as in the first embodiment. While the hook portions 171 and 172 are being inserted into the through hole 52, however, the spacer member 10 abuts against the circuit board 5 so that it does not move any more in the axial direction of the operation shaft 12. However, the hook portions 171 and 172 gradually leave the spacer member 10 so that they finally come into engagement with the peripheral edge of the through hole 52 of the circuit board 5, as shown in FIG. 5. Thus, the work of mounting the operation shaft 12 is completed.

From this embodiment, it is possible to expect actions and effects like those of the aforementioned first embodiment. Here in the present embodiment, the holding portion 163 is formed but can be eliminated. When the elastic member 13 is inserted onto the ridge-shaped holding portion 163, more specifically, its portion is fitted across the ridge shape on the holding portion 163 so that the assembling work takes a long time. In the present embodiment, however, the holding portion 163 is eliminated, and the spacer member 10 for holding the elastic member 13 on the second stem portion 17 is inserted through the hook portions 171 and 172 thereby to prevent the elastic member 13 from coming out of the stopper portion 162. Without fitting the holding portion 163 on the elastic member 13, therefore, the elastic member 13 can be held on the operation shaft 12 through the spacer member 10 thereby to improve the assembling workability.

By interposing the spacer member 10 between the elastic member 13 and the hook portions 171 and 172 before the operation shaft 12 is inserted and mounted on the circuit board 5, moreover, the elastic member 13 is held in advance on the operation shaft 12 and can be prevented from coming out thereby to improve the assembling workability.

In the present embodiment, moreover, the spacer member 10 is interposed between the elastic member 13 and the circuit board 5 when the operation shaft 12 is mounted on the circuit board 5. Therefore, the stress of the elastic member 13 to be applied to the circuit board 5 can be borne by the spacer member 10 thereby to suppress the affections such as the damage of the circuit board 5. Therefore, the spacer member 10 also has a function as a protecting member for protecting the circuit board 5.

Another merit obtained by providing the spacer member 10 as in the present embodiment is that the circuit board 5 can be protected by the spacer member 10. Therefore, the aforementioned circuit pattern can also be formed on the surface of the circuit board 5 corresponding to the spacer member 10. As a result, there can be attained advantages that it is possible to improve the degree of freedom for designing the aforementioned circuit pattern and to lighten the load on the art work at the time of designing the aforementioned circuit pattern.

Here, in the present embodiment, the spacer member 10 is made of the synthetic resin, but any material may be applied if it can prevent the short-circuiting of the circuit board 5.

Figure 6:
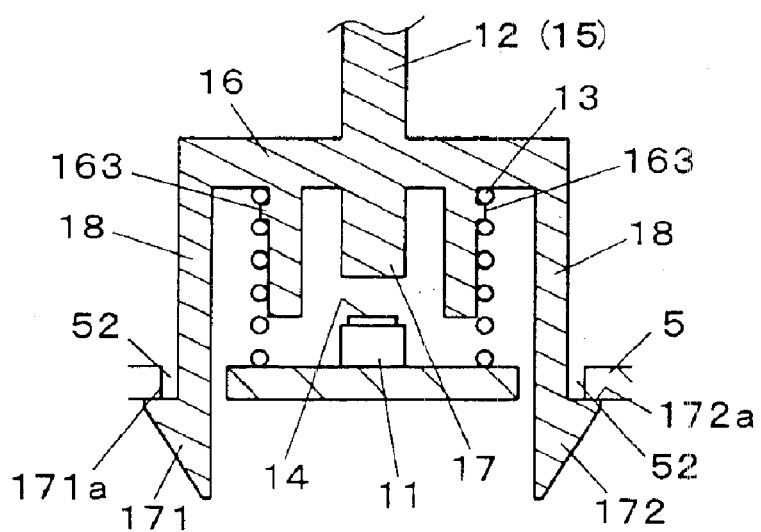
FIG. 6 is a sectional view of an essential portion of a vehicular meter according to a third embodiment of the present invention.

FIG. 6 shows a third embodiment of the vehicular meter according to the present invention. In the present embodiment, the push portion 161 for actuating the switch element 11 is formed by the second stem portion 17 itself, and the hook portions 171 and 172 to engage with the back face of the circuit board 5 through the through hole 52 of the circuit board 5 are formed at the leading end sides of a pair of elastic members 18 formed outside of the flange portion 16. Effects similar to those of the aforementioned first embodiment can also be expected by the present embodiment.

Here, the aforementioned individual embodiments are provided with the paired hook portions 171 and 172. However, the number of hook portions 171 is arbitrary, and the operation shaft 12 can be held more stably with respect to the circuit board 5 by increasing the number of hook portions 171 and 172 to be formed.

Industrial Applicability

The present invention relates to a vehicular meter to be mounted on various vehicles such as motorbikes or automobiles, and can be applied to a vehicular meter, into which there are incorporated an indication element for indicating pieces of information such as the travel distance, the fuel consumption, the ambient temperature and the time, and a manipulation mechanism for resetting/interchanging the information indicated in the indication element.

What is claimed is:

1. A vehicular meter characterized: by comprising: an indication element for indicating a predetermined piece of information, a circuit board arranged on the back of said indication element, and a manipulation mechanism for switching pieces of information to be indicated by said indication element; in that said manipulation mechanism includes a switch element mounted on said circuit board, an operation shaft for activating said switch element by a pushing operation, and an elastic member for returning said operation shaft in the non-pushing direction; in that said operation shaft includes a push portion for actuating said switch element, hook portions inserted into a through hole formed in said circuit board to come into engagement with the back face of said circuit board, and a flange portion opposed to said circuit board; and in that said elastic member is positioned between said flange portion and said circuit board for biasing said hook portions in a direction to abut against said circuit board by its restoring force, wherein said flanae portion is provided with a stopper portion for regulating the movement of said operation shaft in a pushing direction, and said elastic member is disposed on an outer circumferential portion of said stopper portion.

2. A vehicular meter characterized: by comprising: an indication element for indicating a predetermined piece of information, a circuit board arranged on the back of said indication element, and a manipulation mechanism for switching pieces of information to be indicated by said indication element; in that said manipulation mechanism includes a switch element mounted on said circuit board, an operation shaft for activating said switch element by a pushing operation, an elastic member for returning said operation shaft in the non-pushing direction, and a spacer member having an insertion hole for inserting said operation shaft thereinto and interposed between said elastic member and said circuit board; in that said operation shaft includes a push portion for actuating said switch element, hook portions inserted into the insertion hole of said spacer member and into a through hole formed in said circuit board to come into engagement with the back face of said circuit board, and a flange portion opposed to said spacer member; and in that said elastic member is positioned between said flange portion and said spacer member for biasing said hook portions in a direction to abut against said circuit board by its restoring force, wherein said flange portion is provided with a stopper portion for regulating the movement of said operation shaft in a pushing direction, and said elastic member is disposed on an outer circumferential portion of said stopper portion.

3. A vehicular meter as set forth in claim 1 or claim 2, characterized in that said elastic member is made of a coil spring.

4. A vehicular meter as set forth in claim 1 or claim 2, characterized in that a holding portion for holding said elastic member is formed on said operation shaft.

5. A vehicular meter as set forth in claim 1 or claim 2, characterized in that said indication element is driven by said circuit board.

6. A vehicular meter as set forth in claim 2, characterized in that said spacer member is interposed between said elastic member and said hook portions, before said operation shaft is inserted into said circuit board, thereby to hold said elastic member on said operation shaft.

* * * * *